(12) United States Patent
Jalan et al.

(10) Patent No.: US 10,812,348 B2
(45) Date of Patent: Oct. 20, 2020

(54) AUTOMATIC CAPTURE OF NETWORK DATA FOR A DETECTED ANOMALY

(71) Applicant: A10 Networks, Inc., San Jose, CA (US)

(72) Inventors: Rajkumar Jalan, Saratoga, CA (US); Ronald Wai Lun Szeto, San Francisco, CA (US); Rishi Sampat, Santa Clara, CA (US); Julia Lin, Saratoga, CA (US)

(73) Assignee: A10 Networks, Inc., San Jose, CA (US)

( * ) Notice: Subject to any disclaimer, the term of this patent is extended or adjusted under 35 U.S.C. 154(b) by 150 days.

(21) Appl. No.: 15/211,968

(22) Filed: Jul. 15, 2016

(65) Prior Publication Data

US 2018/0019931 A1   Jan. 18, 2018

(51) Int. Cl.
*H04L 12/26* (2006.01)
*H04L 12/24* (2006.01)

(52) U.S. Cl.
CPC .......... *H04L 43/04* (2013.01); *H04L 41/0681* (2013.01); *H04L 41/12* (2013.01); *H04L 41/142* (2013.01); *H04L 43/08* (2013.01); *H04L 43/106* (2013.01)

(58) Field of Classification Search
CPC combination set(s) only.
See application file for complete search history.

(56) References Cited

U.S. PATENT DOCUMENTS

| | | |
|---|---|---|
| 4,001,819 A | 1/1977 | Wise |
| 5,101,402 A | 3/1992 | Chiu et al. |
| 5,163,088 A | 11/1992 | LoCascio |
| 5,359,659 A | 10/1994 | Rosenthal |
| 5,414,833 A | 5/1995 | Hershey et al. |
| 5,684,875 A | 11/1997 | Ellenberger |
| 5,940,002 A | 8/1999 | Finn et al. |
| 5,960,177 A | 9/1999 | Tanno |
| 6,088,804 A | 7/2000 | Hill et al. |
| 6,119,236 A | 9/2000 | Shipley |

(Continued)

FOREIGN PATENT DOCUMENTS

| | | |
|---|---|---|
| CN | 1422468 A | 6/2003 |
| CN | 104106241 A | 10/2014 |

(Continued)

OTHER PUBLICATIONS

"How to Create a Rule in Outlook 2003" CreateaRule-Outlook2003. doc 031405 mad, 3 pages.

(Continued)

*Primary Examiner* — Nicholas R Taylor
*Assistant Examiner* — Tania M Pena-Santana
(74) *Attorney, Agent, or Firm* — Keith Kline; The Kline Law Firm PC (57) ABSTRACT

Methods and systems are provided for automatically capturing network data for a detected anomaly. In some examples, a network node establishes a baseline usage by applying at least one baselining rule to network traffic to generate baseline statistics, detects an anomaly usage by applying at least one anomaly rule to network traffic and generating an anomaly event, and captures network data according to an anomaly event by triggering at least one capturing rule to be applied to network traffic when an associated anomaly event is generated.

25 Claims, 5 Drawing Sheets

(56) References Cited

U.S. PATENT DOCUMENTS

| | | |
|---|---|---|
| 6,205,115 B1 | 3/2001 | Ikebe et al. |
| 6,237,036 B1 | 5/2001 | Ueno et al. |
| 6,304,975 B1 | 10/2001 | Shipley |
| 6,324,286 B1 | 11/2001 | Lai et al. |
| 6,449,651 B1 | 9/2002 | Dorfman et al. |
| 6,519,703 B1 | 2/2003 | Joyce |
| 6,594,780 B1 | 7/2003 | Shen et al. |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,988,106 B2 | 1/2006 | Enderwick et al. |
| 7,159,237 B2 | 1/2007 | Schneier et al. |
| 7,194,766 B2 | 3/2007 | Noehring et al. |
| 7,222,366 B2 | 5/2007 | Bruton, III et al. |
| 7,296,283 B2 | 11/2007 | Hrastar et al. |
| 7,392,241 B2 | 6/2008 | Lin et al. |
| 7,418,733 B2 | 8/2008 | Connary et al. |
| 7,543,052 B1 | 6/2009 | Cesa Klein |
| 7,565,549 B2 | 7/2009 | Satterlee et al. |
| 7,577,833 B2 | 8/2009 | Lai |
| 7,593,936 B2 | 9/2009 | Hooks |
| 7,640,591 B1 | 12/2009 | Tripathi et al. |
| 7,653,633 B2 | 1/2010 | Villella et al. |
| 7,665,138 B2 | 2/2010 | Song et al. |
| 7,739,736 B1 | 6/2010 | Tripathi et al. |
| 7,809,131 B1 | 10/2010 | Njemanze et al. |
| 7,895,649 B1 | 2/2011 | Brook et al. |
| 8,037,532 B2 | 10/2011 | Haswell |
| 8,220,056 B2 | 7/2012 | Owens, Jr. |
| 8,239,670 B1 | 8/2012 | Kaufman et al. |
| 8,289,981 B1 | 10/2012 | Wei et al. |
| 8,301,802 B2 | 10/2012 | Wei et al. |
| 8,448,245 B2 | 5/2013 | Banerjee et al. |
| 8,478,708 B1 | 7/2013 | Larcom |
| 8,595,845 B2 | 11/2013 | Basavapatna et al. |
| 8,800,034 B2 | 8/2014 | McHugh et al. |
| 8,806,011 B1 | 8/2014 | Graham-Cumming |
| 8,813,228 B2 | 8/2014 | Magee et al. |
| 8,832,832 B1 | 9/2014 | Visbal |
| 8,984,331 B2 | 3/2015 | Quinn |
| 9,141,792 B2 * | 9/2015 | Baluda .................. G06F 21/552 |
| 9,215,208 B2 | 12/2015 | Fraize et al. |
| 9,258,217 B2 | 2/2016 | Duffield et al. |
| 9,332,024 B1 | 5/2016 | Gulko |
| 2001/0042204 A1 | 11/2001 | Blaker et al. |
| 2002/0087708 A1 | 7/2002 | Low et al. |
| 2002/0188839 A1 | 12/2002 | Noehring et al. |
| 2003/0023846 A1 | 1/2003 | Krishna et al. |
| 2003/0028585 A1 | 2/2003 | Yeager et al. |
| 2003/0061507 A1 | 3/2003 | Xiong et al. |
| 2003/0069973 A1 | 4/2003 | Ganesan et al. |
| 2003/0135625 A1 | 7/2003 | Fontes et al. |
| 2003/0187688 A1 | 10/2003 | Fey et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0059943 A1 | 3/2004 | Marquet et al. |
| 2004/0059951 A1 | 3/2004 | Pinkas et al. |
| 2004/0059952 A1 | 3/2004 | Newport et al. |
| 2004/0093524 A1 | 5/2004 | Sakai |
| 2004/0111635 A1 | 6/2004 | Boivie et al. |
| 2004/0143751 A1 | 7/2004 | Peikari |
| 2004/0242200 A1 | 12/2004 | Maeoka et al. |
| 2004/0250124 A1 * | 12/2004 | Chesla .................. G06F 21/552 726/13 |
| 2005/0021999 A1 | 1/2005 | Touitou et al. |
| 2005/0036501 A1 | 2/2005 | Chung et al. |
| 2005/0041584 A1 | 2/2005 | Lau et al. |
| 2005/0044068 A1 | 2/2005 | Lin et al. |
| 2005/0044270 A1 | 2/2005 | Grove et al. |
| 2005/0108377 A1 * | 5/2005 | Lee .................. H04L 63/1408 709/223 |
| 2005/0108434 A1 | 5/2005 | Witchey |
| 2005/0210243 A1 | 9/2005 | Archard et al. |
| 2005/0234920 A1 * | 10/2005 | Rhodes .................. G06F 21/552 |
| 2005/0257093 A1 | 11/2005 | Johnson et al. |
| 2006/0026678 A1 | 2/2006 | Zakas |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0206936 A1 | 9/2006 | Liang et al. |
| 2006/0212522 A1 | 9/2006 | Walter et al. |
| 2006/0251057 A1 | 11/2006 | Kwon et al. |
| 2006/0253902 A1 | 11/2006 | Rabadan et al. |
| 2006/0256716 A1 | 11/2006 | Caci |
| 2006/0265585 A1 | 11/2006 | Lai |
| 2006/0288411 A1 | 12/2006 | Garg et al. |
| 2007/0056038 A1 | 3/2007 | Lok |
| 2007/0073660 A1 | 3/2007 | Quinlan |
| 2007/0245420 A1 * | 10/2007 | Yong .................. H04L 41/28 726/23 |
| 2007/0291773 A1 | 12/2007 | Khan et al. |
| 2008/0181100 A1 * | 7/2008 | Yang .................. H04L 41/0654 370/216 |
| 2008/0183885 A1 | 7/2008 | Durrey et al. |
| 2008/0229418 A1 | 9/2008 | Chen et al. |
| 2008/0256623 A1 | 10/2008 | Worley et al. |
| 2009/0049198 A1 | 2/2009 | Blinn et al. |
| 2009/0070470 A1 | 3/2009 | Bauman et al. |
| 2009/0150996 A1 | 6/2009 | Haswell |
| 2009/0168995 A1 | 7/2009 | Banga et al. |
| 2009/0227228 A1 | 9/2009 | Hu et al. |
| 2009/0241190 A1 | 9/2009 | Todd et al. |
| 2009/0287941 A1 | 11/2009 | Shouno |
| 2010/0027432 A1 * | 2/2010 | Gopalan .................. H04L 41/142 370/252 |
| 2010/0106833 A1 | 4/2010 | Banerjee et al. |
| 2010/0284300 A1 | 11/2010 | Deshpande et al. |
| 2010/0286998 A1 | 11/2010 | Picken |
| 2011/0026537 A1 | 2/2011 | Kolhi et al. |
| 2011/0029599 A1 | 2/2011 | Pulleyn et al. |
| 2011/0082947 A1 | 4/2011 | Szeto et al. |
| 2011/0093785 A1 | 4/2011 | Lee et al. |
| 2011/0131646 A1 | 6/2011 | Park et al. |
| 2011/0153744 A1 | 6/2011 | Brown |
| 2011/0249572 A1 | 10/2011 | Singhal et al. |
| 2012/0036272 A1 | 2/2012 | El Zur |
| 2012/0042060 A1 | 2/2012 | Jackowski et al. |
| 2012/0110472 A1 | 5/2012 | Amrhein et al. |
| 2012/0117646 A1 | 5/2012 | Yoon et al. |
| 2012/0163186 A1 | 6/2012 | Wei et al. |
| 2012/0174196 A1 | 7/2012 | Bhogavilli et al. |
| 2012/0226582 A1 | 9/2012 | Hammad |
| 2012/0307631 A1 | 12/2012 | Yang et al. |
| 2013/0019025 A1 | 1/2013 | Chaturvedi et al. |
| 2013/0124713 A1 | 5/2013 | Feinberg et al. |
| 2013/0128885 A1 | 5/2013 | Kardashov et al. |
| 2013/0139245 A1 | 5/2013 | Thomas |
| 2013/0173795 A1 | 7/2013 | McPherson |
| 2013/0198385 A1 | 8/2013 | Han et al. |
| 2013/0212265 A1 | 8/2013 | Rubio Vidales et al. |
| 2014/0006508 A1 | 1/2014 | Goyet et al. |
| 2014/0025568 A1 | 1/2014 | Smith et al. |
| 2014/0137190 A1 | 5/2014 | Carey et al. |
| 2014/0143868 A1 * | 5/2014 | Shiva .................. G06F 21/552 726/23 |
| 2014/0258489 A1 | 9/2014 | Muppala et al. |
| 2014/0258536 A1 | 9/2014 | Chiong |
| 2014/0269308 A1 | 9/2014 | Oshiba |
| 2014/0269339 A1 * | 9/2014 | Jaafar .................. H04L 41/142 370/241 |
| 2014/0280832 A1 | 9/2014 | Oshiba |
| 2014/0283065 A1 | 9/2014 | Teddy et al. |
| 2014/0298091 A1 | 10/2014 | Carlen |
| 2014/0310396 A1 | 10/2014 | Christodorescu et al. |
| 2014/0325588 A1 | 10/2014 | Jalan et al. |
| 2015/0033341 A1 | 1/2015 | Schmidtler et al. |

(56) References Cited

U.S. PATENT DOCUMENTS

2015/0088597 A1    3/2015   Doherty et al.
2015/0312268 A1    10/2015  Ray
2015/0333988 A1    11/2015  Jalan et al.

FOREIGN PATENT DOCUMENTS

| HK | 1198848 A | 6/2015 |
|---|---|---|
| TW | 375721 | 12/1999 |
| TW | 477140 B | 2/2002 |
| TW | 574655 B | 2/2004 |
| TW | 576066 B | 2/2004 |
| TW | I225999 B | 1/2005 |
| TW | I252976 B | 4/2006 |
| WO | WO1998042108 A1 | 9/1998 |
| WO | WO2013112492 A1 | 8/2013 |
| WO | WO2014150617 A1 | 9/2014 |
| WO | WO2014151072 A1 | 9/2014 |
| WO | WO2014176461 A1 | 10/2014 |

OTHER PUBLICATIONS

Oracle Corporation, "Oracle Intelligent Agent User's Guide," Release 9.2.0, Part No. A96676-01, Mar. 2002.

F5 Networks, Inc., "SOL11243: iRules containing the RULE_INIT iRule event do not re-initialize when a syntax error is corrected," f5.support.com, May 24, 2010, 1 page.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Dainotti, Albert et al., "TIE: A Community-Oriented Traffic Classification Platform," May 11, 2009, Springer-Verlag, Traffic Monitoring and Analysis: Proceedings First International Workshop, TMA 2009. pp. 64-74. Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Search Report and Written Opinion dated Sep. 28, 2017 for PCT Application No. PCT/US2017/041463.

Guo, Yuan-ni et al., "An Embedded Firewall System Design Based on Ptolemy II," Journal of System Simulation, vol. 16, No. 6, pp. 1361-1363, Jun. 2004.

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.

* cited by examiner

AUTOMATIC CAPTURE OF NETWORK DATA FOR A DETECTED ANOMALY

BACKGROUND OF THE INVENTION

Field of the Invention

This invention relates generally to data network and more particularly to a network node automatically capturing network data during an anomaly.

Description of the Related Art

Both consumer computing and business computing are moving at a fast pace toward mobile computing and cloud computing. Data networks that support mobile computing and cloud computing needs are growing at accelerated rates. These data networks behave differently from prior data networks supporting mostly static computing environments such as desktops, offices, and server rooms. In a mobile computing environment, users do not stay in a place for a long time. They move from place to place in a matter of hours, minutes, or even seconds as the users may be in a driving vehicle or strolling on a street. In a cloud computing environment, enterprise or service servers are allocated in different data centers in different locations, perhaps in different cities or countries. The servers may be allocated on demand and may be brought to service in a matter of minutes. Therefore, in today's data networks, it is difficult, if not impossible, to predict where a user terminal is or where a server is for a network service session. The task for a network administrator to troubleshoot a data network is very difficult. Once a data network is put in place based on a current plan, a network administrator must oversee the usage of the data network and address any usage anomaly due to unexpected usage or failure of the network. Typically, a usage anomaly occurs when a service becomes popular, leading to excessive server access, or when a resource or facility fails causing traffic to be routed and congested. In the new mobile and cloud computing environments, the same usage showing a healthy functioning data network yesterday may lead to a congested server without any failure of data network. In part, the anomaly may be caused by changing locations of mobile users. In part, it may be caused by changing of allocation of servers. In part, it may be caused by a combination of mobile users and server allocation. When an anomaly occurs, it is important for the network administrator to examine detailed data to determine the cause, so as to correct the configurations of the data network.

It should be apparent from the foregoing that there is a need to provide a smart analyzer to assist a network element to capture detailed network data during a network usage anomaly.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to some embodiments, the present technology is directed to a network node for detecting and storing network usage anomalies, the network node storing instructions that when executed by at least one processor: establish a baseline usage by applying at least one baselining rule to network traffic to generate baseline statistics; detect an anomaly usage by applying at least one anomaly rule to network traffic and generating an anomaly event; and capture network data according to an anomaly event by triggering at least one capturing rule to be applied to network traffic when an associated anomaly event is generated.

According to other embodiments, the present technology is directed to a corresponding method for capturing network data during a network usage anomaly based on a network usage model.

BRIEF DESCRIPTION OF THE DRAWINGS

Embodiments are illustrated by way of example and not by limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

Figure 1:
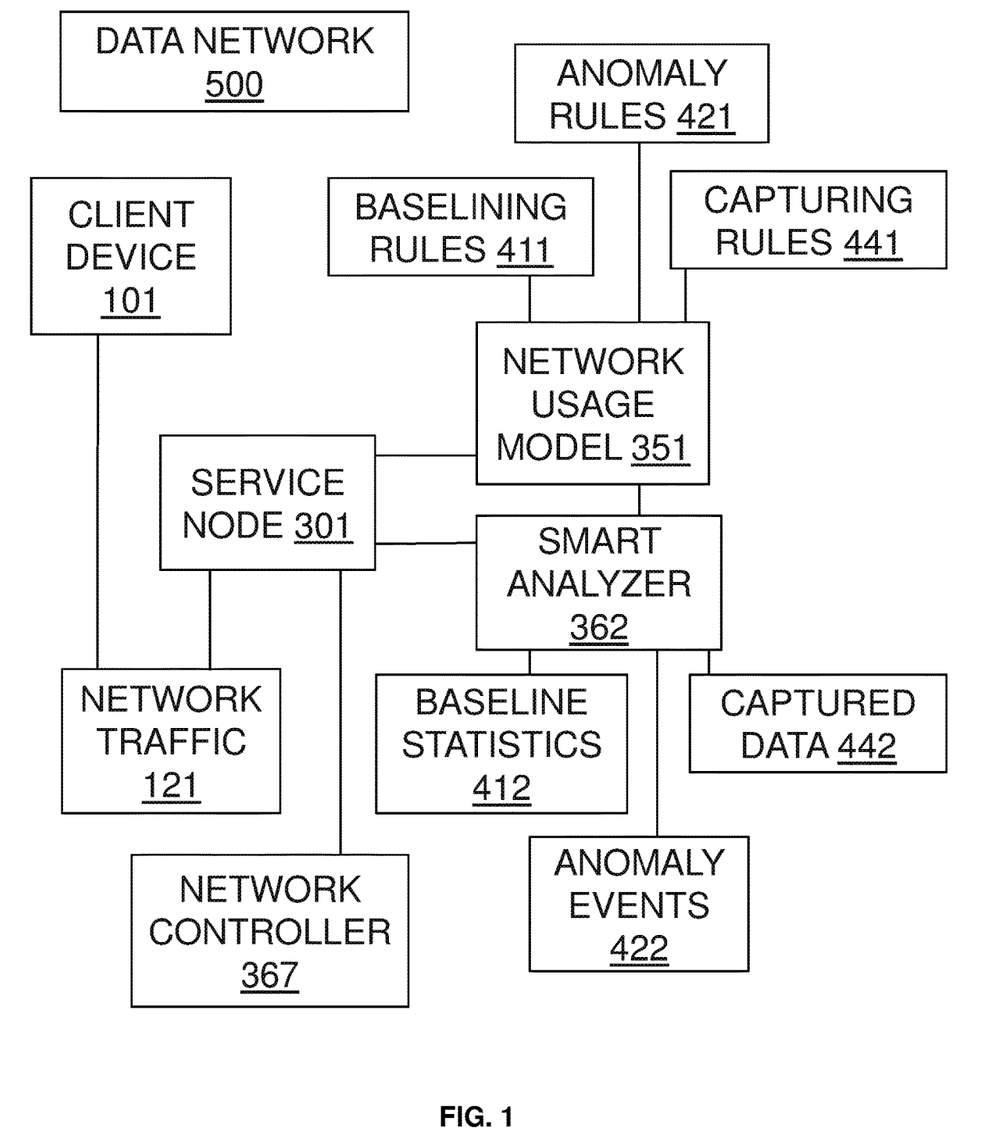
FIG. 1 illustrates an exemplary embodiment of a network node capturing network data during an anomaly event.

FIG. 1 illustrates an exemplary embodiment of a network node capturing network data during an anomaly event. In the exemplary embodiment, service node 301 connects to data network 500 and receives network traffic 121. In some embodiments, network traffic 121 includes a plurality of network data transmitted by one or more network devices, such as client device 101. Service node 301 analyzes network traffic 121 according to a network usage model 351.

In exemplary embodiments, service node 301 includes a smart analyzer 362 to process network traffic 121 based on network usage model 351. Network usage model 351 may include at least one baselining rule 411, at least one anomaly rule 421, or at least one data capturing rule 441. In some embodiments, smart analyzer 362 processes baselining rules 411 and generates baseline statistics 412; processes anomaly rules 421 and generates at least one anomaly event 422; and processes capturing rules 441 to generate captured data 442. In further embodiments, smart analyzer 362 processes anomaly rules 421 together with baselining rules 411 and/or baseline statistics 412 to generate anomaly event 422. In some embodiments, smart analyzer 362 processes capturing rules 441 according to anomaly event 422 to generate captured data 442 for anomaly event 422.

In exemplary embodiments, service node 301 stores baseline statistics 412, anomaly event 422, and/or captured data 442 in a storage medium of service node 301. Service node 301 may send baseline statistics 412, anomaly event 422, and/or captured data 442 to network controller 367 computing device, which may be a network computer such as a network management system for storage or for further processing.

Figure 2:
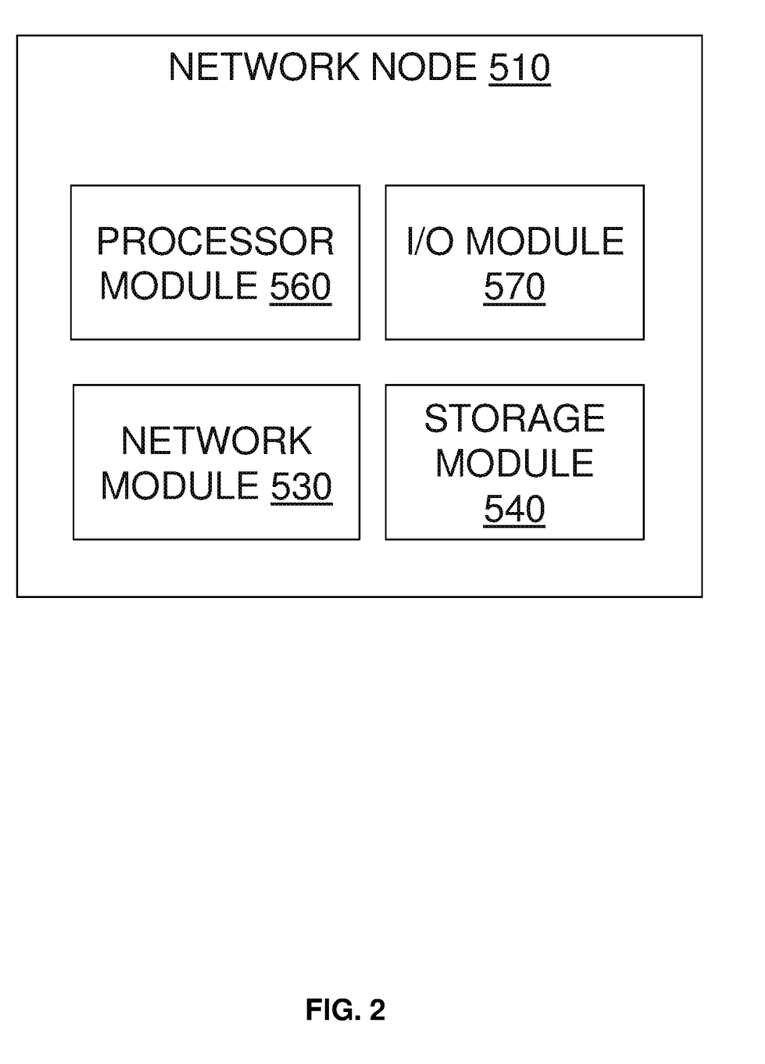
FIG. 2 illustrates an exemplary embodiment of a network node.

FIG. 2 illustrates an exemplary embodiment of a network node 510 or a network computer which can be a security gateway, a client device, a server device, or the like. Network node 510 may include a processor module 560, a network module 530, and a storage module 540. Processor module 560 may include at least one processor which may be a micro-processor, an Intel processor, an AMD processor, a MIPS processor, an ARM-based processor, a RISC processor, or any other type of processor. Processor module 560 may include at least one processor core embedded in a processor. Additionally, processor module 560 may include at least one embedded processor or embedded processing element in a Field Programmable Gate Array (FPGA), an Application Specific Integrated Circuit (ASIC), or Digital Signal Processor (DSP). In some embodiments, network module 530 includes a network interface such as Ethernet, optical network interface, a wireless network interface, T1/T3 interface, a WAN or LAN interface. Furthermore, network module 530 may include a network processor. Storage module 540 may include RAM, DRAM, SRAM, SDRAM or memory utilized by processor module 560 or network module 530. Storage module 540 may store data utilized by processor module 560. In some embodiments, storage module 540 includes a hard disk drive, a solid state drive, an external disk, a DVD, a CD, or a readable external disk. Additionally, storage module 540 may store at least one computer programming instruction which when executed by processor module 560 or network module 530 implement at least one of the functionality of the present invention. Network node 510 may also include an input/output (I/O) module 570, which may include a keyboard, a keypad, a mouse, a gesture-based input sensor, a microphone, a physical or sensory input peripheral, a display, a speaker, or a physical or sensory output peripheral.

Returning to FIG. 1, in some embodiments, client device 101 is a network node, as illustrated in FIG. 2, connected to data network 500. Client device 101 can be a personal computer, a laptop computer, a tablet, a smartphone, a mobile phone, an Internet phone, a netbook, a home gateway, a broadband gateway, a network appliance, a set-top box, a media server, a personal media play, a personal digital assistant, an access gateway, a networking switch, a server computer, a network storage computer, or any computing device comprising at least a network module and a processor module.

In exemplary embodiments, service node 301 is a network node and includes at least one of a functionality of a firewall, a SSL proxy gateway, a server load balancer (SLB), an application delivery controller (ADC), a threat protection system (TPS), a secure traffic manager, a legal interception gateway, a virtual private network (VPN) gateway, or a TCP proxy gateway. In another embodiment, service node 301 includes at least one of a functionality of a network switch, a network router, a security network appliance, a broadband gateway, a broadband remote access system, or a layer 2 or layer 3 network element.

In some embodiments, smart analyzer 362 includes a piece of software residing and executing in service node 301. In exemplary embodiments, smart analyzer 362 includes at least one of a processor module, a storage module, or a piece of hardware-based network processing module.

Data network 500 may include an Ethernet network, an ATM network, a cellular network, a wireless network, a Frame Relay network, an optical network, an IP network or any data communication network utilizing other physical layer, link layer capability or network layer to carry data packets. Additionally, data network 500 may include a corporate network, a data center network, the Internet, a service provider network, or a mobile operator network.

Figure 3:
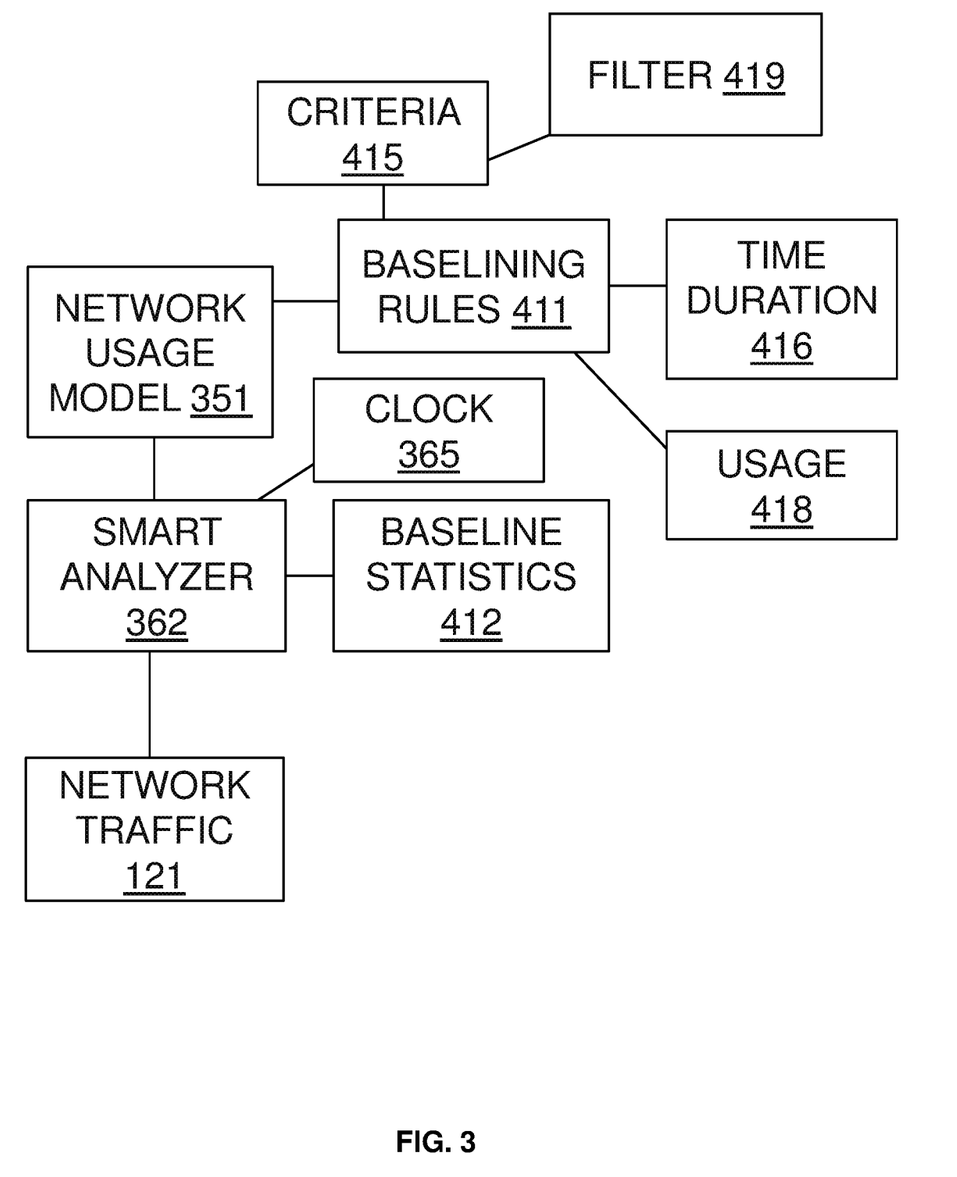
FIG. 3 illustrates an exemplary embodiment of establishing a baseline usage.

FIG. 3 illustrates an exemplary embodiment of establishing a baseline usage. In this embodiment, smart analyzer 362 processes network usage model 351, which includes baselining rules 411 to generate baseline statistics 412. In some embodiments, baselining rules 411 include criteria 415, which indicates a method to process network traffic 121 in order to generate statistic data for baseline statistics 412. Network traffic 121 may include data packets at link layer, such as Ethernet, WLAN, or VLAN; network layer, such as IP packets; session layer, such as TCP, UDP, IPSec, or SSL; or application layer, such as HTTP, FTP, telnet, network applications, or applications such as video streaming, music streaming, email, instant messaging, or photo upload. In various embodiments, criteria 415 includes a filter 419 which indicates at least one filter criteria for processing network traffic 121. Network traffic 121 satisfying filter 419 is processed to generate baseline statistics 412. In some embodiments, filter 419 includes a network address such as an IP address, a source IP address, or a destination IP address. In the exemplary embodiment of FIG. 3, IP data packets of network traffic 121 having the specified network address in filter 419 are processed. In some embodiments, filter 419 includes a network interface or its identity, such as an Ethernet interface, a VLAN interface, a virtual interface, a virtual routing interface, a physical interface, or a port of a network module of the network node. Filter 419 can specify a content pattern such as a URL, a domain name, a cookie, or a file name of an application layer protocol such as HTTP or FTP. Filter 419 also can indicate a content signature such as a user identity, a universally unique identifier (UUID) of a smartphone, a device identity, or a mobile application identity.

In some embodiments, baselining rules 411 include a time duration 416 indicating a duration of time where the baselining rules 411 are to be applied to generate baseline statistics 412. For example, time duration 416 may include morning hours, 5 am-8 am, lunch hour, 12 pm-2 pm, evening, weekend, a day of a year, February 14, a range of days, June 1-August 15, day of a week, Monday morning, Friday evening, 12:15 pm-4:27 pm today, or any duration of time or days. In exemplary embodiments, smart analyzer 362 is connected to a clock 365 and checks clock 365 against time duration 416 to start and stop applying baselining rules 411.

In various embodiments, baselining rules 411 include usage 418, indicating at least one quantitative counter to be calculated by smart analyzer 362 in order to generate baseline statistics 412. Usage 418 may indicate packet length, session count, bandwidth utilization, a rate, such as rate per second, rate per minute, rate per hour, rate per day, rate per millisecond, or other types. For example, combining usage 418, filter 419, and time duration 416, baselining rules 411 may specify to smart analyzer 362 to count packet lengths of IP packets over an interface where the destination IP address is in range 134.154.1.0 to 134.154.27.234, or to count HTTP session rate per minute during Christmas 2015 for domain names abc.com and google.com, or to count bandwidth usage of all interfaces on the gigabit Ethernet card in the last 24 hours.

In some embodiments, smart analyzer 362 processes baselining rules 411 and determines one or more counters accordingly. Moreover, smart analyzer 362 may generate one or more baseline statistics 412 based on the counters. In an exemplary embodiment, smart analyzer 362 calculates a minimum value, a maximum value, a mean value, or a median value of the counters. In another embodiment, smart analyzer 362 calculates values based on a statistical model such as a standard deviation, a second moment, or a distribution, based on the counters. In further embodiments, smart analyzer 362 calculates these statistical values as baseline statistics 412. Furthermore, smart analyzer 362 stores baseline statistics 412 in a datastore or storage medium of service node 301.

Figure 4:
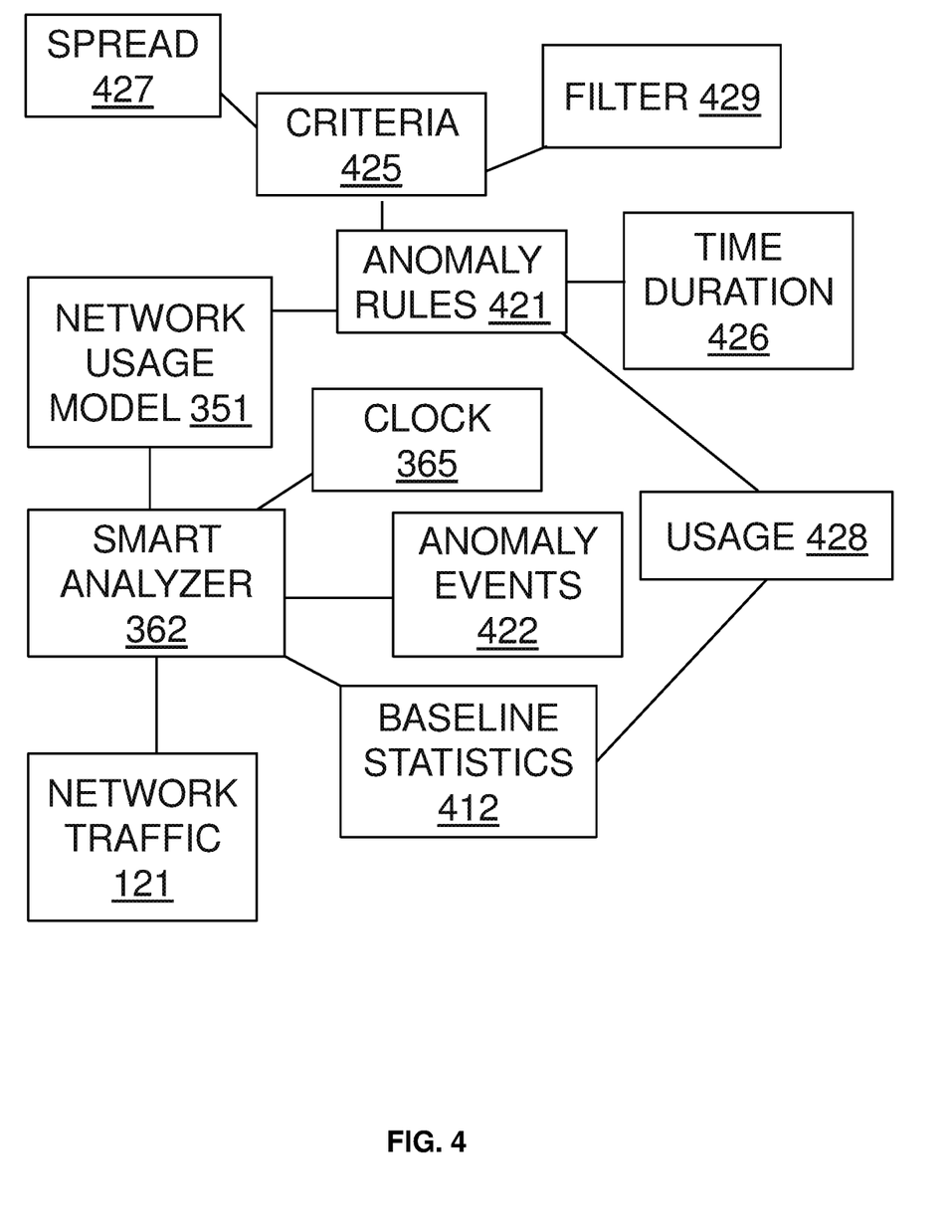
FIG. 4 illustrates an exemplary embodiment of detecting an anomaly usage.

FIG. 4 illustrates an exemplary embodiment of detecting an anomaly usage. In this embodiment, network usage model 351 includes anomaly rules 421 to help detect an anomaly usage indicated by anomaly event 422. In some embodiments, anomaly rules 421 include at least one criteria 425 and/or a time duration 426. Time duration 426 includes a period of time when anomaly rules 421 is to be applied. Time duration 426 may include, for example, morning hours, 8 am-5 pm, midnight, weekend, every weekday, Christmas, or any duration of time. In various embodiments, criteria 425 includes a filter 429, which may include at least one network address, piece of content, content signature, network interface, or other filter to be applied for anomaly rules 421. In exemplary embodiments, smart analyzer 362 connects to clock 365, and based on matching clock 365 and time duration 426, determines to apply anomaly rules 421 to network traffic 421. Smart analyzer 362 receives network traffic 421 and applies filter 429 of anomaly rules 421 to received network traffic 421. In some embodiments, anomaly rules 421 further includes usage 428, which indicates one or more means for smart analyzer 362 to count or calculate when processing network traffic 421. Usage 428 may indicate packet length, session count, bandwidth utilization, a rate, or other counting means. Upon determining at least one usage counter after applying usage 428, smart analyzer 362 applies criteria 425 to the at least one usage counters to determine if criteria 425 is satisfied. In various embodiments, criteria 425 indicates a deviation from a pre-determined metric to signal an anomaly. For example, criteria 425 may include calculation of a plurality of deviations from a plurality of metrics based on the usage counters in order to determine an anomaly. In some embodiments, criteria 425 is determined to be satisfied. Smart analyzer 362 generates an anomaly event 422 for the satisfied criteria 425. In various embodiments, usage 428 is associated to previously determined baseline statistics 412 as illustrated in this application. Smart analyzer 362 retrieves baseline statistics 412, from a storage medium or datastore, which may include statistical data such as minimum, maximum, mean, or median. Smart analyzer 362 uses baseline statistics 412 when applying criteria 425 with the usage counters. In some embodiments, criteria 425 includes spread 427, which indicates a range of values when comparing calculated usage counters and baseline statistics 412. Criteria 425 may include a rule to compare whether a session rate usage counter, determined from usage 428, is larger than a spread 427 of 200% of a maximum session rate usage counter according to baseline statistics 412. If the rule is satisfied, criteria 425 indicates there is an anomaly. In another embodiment, criteria 425 includes a rule to be satisfied over a time duration, such as 3 seconds, 1 minute, 2 hours, or any other time duration in order to indicate an anomaly.

Figure 5:
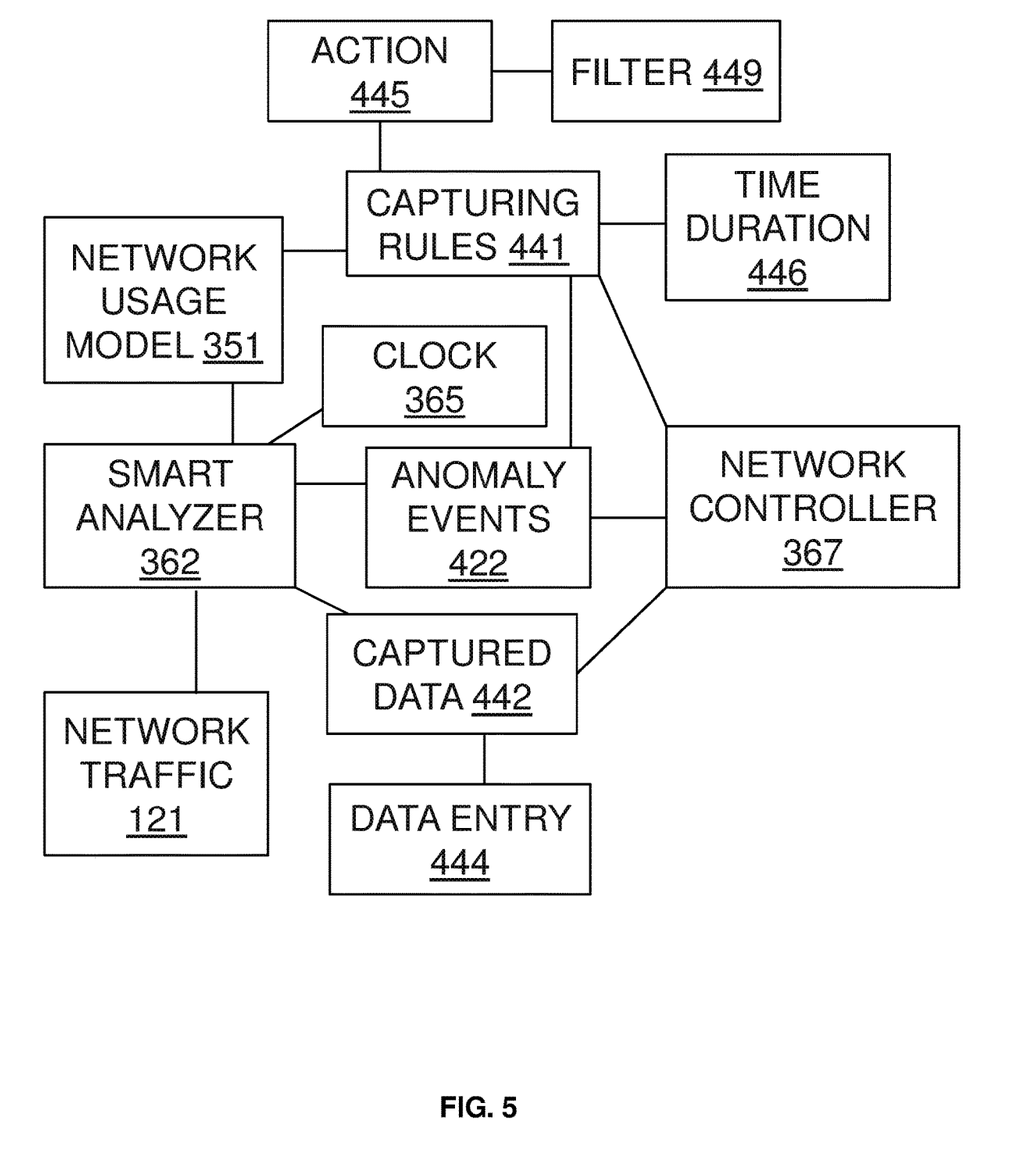
FIG. 5 illustrates an exemplary embodiment of capturing network data according to an anomaly event.

FIG. 5 illustrates an exemplary embodiment of capturing network data according to an anomaly event. In this embodiment, network usage model 351 includes capturing rules 441, which when applied, allows smart analyzer 362 to process network traffic 121 to generate captured data 442. In some embodiments, capturing rules 441 associate to anomaly event 422, which when generated, triggers capturing rules 441 to be applied. In exemplary embodiments, capturing rules 441 include a time duration 446 indicating a duration of time to capture data. Time duration 446 may include a start time, a stop time, 10 seconds, 500 milliseconds, 20 milliseconds, 2 hours, one day, every other hour, or any duration of time. In another embodiment, capturing rules 441 includes an action 445 indicating a data capturing action. For example, action 445 may indicate "capture packet trace", "trace session", "record user cookies and timestamp", "capture GET-REQUEST:URL", "record TCP: option fields" or other capturing action with an indication of data to be captured. Furthermore, in some embodiments, capturing rules 441 include a filter 449 to be applied to network traffic 121 when action 445 is used to capture data. Filter 449 may include a network address, a content pattern, an interface, a protocol, or other filter. Additionally, filter 449 may indicate a source IP address, a content pattern matching a file name, a virtual service IP address, and a protocol of HTTP.

In an exemplary embodiment, capturing rules 441 indicates an association to anomaly event 422, which indicates a high access rate of website internal.abcde.com; a time duration 446 of start time in one minute and a duration of one hour; an action 445 to capture session timestamps, source IP address, or user-id in cookies; a filter 449 to indicate virtual IP address corresponding to abcde.com, protocol of HTTP, or a content pattern matching "internal-.abcde.com".

Smart analyzer 362, upon applying capturing rules 441 to network traffic 121, generates captured data 442. Smart analyzer 362 generates a data entry 444, according to action 445, to be stored in captured data 442. Data entry 444 may include a timestamp, a packet trace, a session trace of all content for the session, a network address, or a piece data captured according to action 445.

Smart analyzer 362 sends captured data 442 to network controller 367. In another embodiment, smart analyzer 362 sends anomaly event 422 to network controller 367. Network controller 367 processes anomaly event 422 and requests smart analyzer 362 to apply capturing rules 441 of network usage model 351. In some embodiments, network controller 367 sends network usage model 551 or capturing rules 441 to smart analyzer 362.

The invention can be used to detect and record security anomaly using a network usage model 351 including a combination of baselining rules 411, anomaly rules 421, and capturing rules 441. The following tables illustrate one or more security anomaly addressed using this invention.

TABLE 1

Mismatch IP and Layer 2 packet length Usage Model

Anomaly Rules

Filter: IP Packet Length does not match Ethernet packet length
Usage: Packet Count Rate per second (PPS)
Criteria: PPS > 100

TABLE 1-continued

Mismatch IP and Layer 2 packet length Usage Model

Capturing Rules

Filter: IP Packet Length does not match Ethernet packet length
Time Duration: Start immediate, Duration 60 seconds
Action: Record Timestamp, Source IP Address, network interface id, IP packet length

TABLE 2

Fragmentation Attack Usage Model

Baselining Rules

Filter: IP Fragment Packet
Criteria: Fragment Length < 10 bytes
Usage: Packet count
Time Duration: 12:00am-12:00pm tomorrow
Anomaly Rules Filter: IP Fragment Packet, Fragment Length < 10 bytes
Usage: Packet Count Rate per second (PPS)
Criteria: PPS > 100 * (maximum of baseline statistics/24 hr)
Capturing Rules Filter: IP Fragment Packet, Fragment length < 20 bytes
Time Duration: Start immediate, Duration 60 seconds
Action: Record Timestamp, IP packet trace

TABLE 3

LAND(Local Area Network Denial) Attack Usage Model

Baselining Rules

Filter: IP Packet
Criteria: Source port being the same as Destination port
Usage: Packet count
Time Duration: 12:00am-12:00pm tomorrow
Anomaly Rules Filter: IP Packet, Source port being the same as Destination port
Usage: Packet Count Rate per second (PPS)
Criteria: PPS > 100 * (maximum of baseline statistics/24 hr)
Capturing Rules Filter: IP Packet, Source port being the same as Destination port
Time Duration: Start immediate, Duration 10 seconds
Action: Record Timestamp, IP packet header

TABLE 4

Slow Loris Attack Usage Model

Baselining Rules

Filter: TCP Packet, Virtual IP interface
Usage: Packet Length
Time Duration: 12:00am-12:00pm tomorrow
Anomaly Rules Filter: TCP Packet, Virtual IP interface
Usage: Average Packet Length
Criteria: Average Packet Length < Average Baseline Statistics * 30%
Capturing Rules Filter: TCP Packet, Virtual IP interface
Time Duration: Start in 1 second, duration 5 seconds
Action: Record Timestamp, IP packet header The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by programming instructions. These programming instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

What is claimed is:

1. A computer-implemented method for capturing network data during a network usage anomaly based on a network usage model, comprising:
   establishing, by a network node, a baseline usage by applying at least one baselining rule to processing of network traffic in a data network to generate baseline statistics, the applying the at least one baselining rule includes setting, for the network traffic, pre-determined metrics associated with the baseline usage;
   detecting, by the network node, an anomaly usage by:
      applying at least one anomaly rule to the network traffic, wherein the applying the at least one anomaly rule includes applying a first filter to the network traffic to perform a first step of capturing at least a first portion of the network data associated with the network traffic and to determine first metrics associated with the network traffic, the first portion of the network data including at least first data packet fragments having a first length; and
      determining that at least one of the first metrics deviates from at least one of the pre-determined metrics;
   in response to the detecting the anomaly usage, triggering a generation of an anomaly event, the anomaly event being generated based on the first metrics;
   in response to the generating the anomaly event, triggering, by the network node, at least one capturing rule to perform a second step of capturing at least a second portion of the network data associated with further network traffic going through the data network after the generation of the anomaly event, wherein the triggering the at least one capturing rule includes applying a second filter to the further network traffic, the second portion of the network data including at least second data packet fragments having a second length, the second length being greater than the first length, the second data packet fragments of the second portion of the network data being more detailed network data as compared to the first data packet fragments of the first portion of the network data, wherein the more detailed network data is associated with the anomaly event;

based on the capturing at least the second portion of the network data after the generation of the anomaly event, determining second metrics associated with the further network traffic after the generation of the anomaly event, wherein the second metrics differ from the first metrics; and sending, by the network node, the second metrics to a network controller for determining, based on the second metrics, a cause of the anomaly usage and correcting, by the network controller, a configuration of the data network based on the cause and the second metrics to mitigate the anomaly usage.

2. The computer-implemented method of claim 1, wherein the at least one baselining rule comprises at least one of: a criteria indicating a method to process network traffic to generate baseline statistic data, a network usage indicating at least one quantitative counter to be calculated to generate the baseline statistics, and a time duration for applying the at least one baselining rule to generate the baseline statistics.

3. The computer-implemented method of claim 2, wherein the criteria indicating a method to process network traffic comprises at least one filter for processing network traffic.

4. The computer-implemented method of claim 3, wherein if the network traffic satisfies at least one filter, the network traffic is processed to generate the baseline statistics.

5. The computer-implemented method of claim 3, wherein the at least one filter comprises at least one of a network address, a network interface, a content pattern, and a content signature.

6. The computer-implemented method of claim 2, wherein the network usage indicating at least one quantitative counter to be calculated to generate the baseline statistics comprises at least one of a packet length, a session count, a bandwidth utilization, and a session rate.

7. The computer-implemented method of claim 1, wherein the at least one anomaly rule comprises at least one of a criteria indicating an anomaly, a network usage indicating at least one quantitative counter to be calculated when processing network traffic, and a time duration indicating when the at least one anomaly rule is to be applied.

8. The computer-implemented method of claim 7, wherein the criteria indicating an anomaly includes at least one filter comprising at least one of a network address, a network interface, a content pattern, and a content signature.

9. The computer-implemented method of claim 7, wherein the network usage indicating at least one quantitative counter to be calculated when processing network traffic comprises at least one of a packet length, a session count, a bandwidth utilization, and a session rate.

10. The computer-implemented method of claim 7, wherein the generating the anomaly event comprises at least one of: satisfying an anomaly rule, determining if the criteria indicating an anomaly is satisfied when applied to the network usage indicating at least one quantitative counter to be calculated when processing network traffic, and determining if the criteria indicating an anomaly deviates from the at least one of the pre-determined metrics based on the network usage.

11. The computer-implemented method of claim 1, wherein the at least one capturing rule comprises at least one of a time duration to capture data, a data capturing action, and a filter.

12. The computer-implemented method of claim 11, wherein captured network data comprises at least one of a timestamp, a packet trace, a session trace of all content for a session, a network address, or data captured according to a data capturing action.

13. A network node for detecting and storing network usage anomalies, the network node storing instructions that when executed by at least one processor:

establish a baseline usage by applying at least one baselining rule to processing of network traffic in a data network to generate baseline statistics, the applying the at least one baselining rule includes setting, for the network traffic, pre-determined metrics associated with the baseline usage;

detect an anomaly usage by:
applying at least one anomaly rule to the network traffic, wherein the applying the at least one anomaly rule includes applying a first filter to the network traffic to perform a first step of capturing at least a first portion of the network data associated with the network traffic and to determine first metrics associated with the network traffic, the first portion of the network data including at least first data packet fragments having a first length; and
determining that at least one of the first metrics deviates from at least one of the pre-determined metrics;

in response to the detecting the anomaly usage, trigger a generation of an anomaly event, the anomaly event being generated based on the first metrics;

in response to the generating the anomaly event, trigger at least one capturing rule to perform a second step of capturing at least a second portion of the network data associated with further network traffic going through the data network after the generation of the anomaly event, wherein the triggering the at least one capturing rule includes applying a second filter to the further network traffic, the second portion of the network data including at least second data packet fragments having a second length, the second length being greater than the first length, the second data packet fragments of the second portion of the network data being more detailed network data as compared to the first data packet fragments of the first portion of the network data, wherein the more detailed network data is associated with the anomaly event;

based on the capturing at least the second portion of the network data after the generation of the anomaly event, determine second metrics associated with the further network traffic after the generation of the anomaly event, wherein the second metrics differ from the first metrics; and send the second metrics to a network controller for determining, based on the second metrics, a cause of the anomaly usage and correcting, by the network controller, a configuration of the data network based on the cause and the second metrics to mitigate the anomaly usage.

14. The network node of claim 13, wherein the at least one baselining rule comprises at least one of: a criteria indicating a method to process network traffic to generate the baseline statistic data, a network usage indicating at least one quantitative counter to be calculated to generate baseline statistics, and a time duration for applying the at least one baselining rule to generate baseline statistics.

15. The network node of claim 14, wherein the criteria indicating a method to process network traffic to generate the baseline statistic data comprises at least one filter for processing network traffic.

16. The network node of claim 15, wherein if the network traffic satisfies at least one filter, the network traffic is processed to generate the baseline statistics.

17. The network node of claim 15, wherein the at least one filter comprises at least one of a network address, a network interface, a content pattern, and a content signature.

18. The network node of claim 14, wherein the network usage indicating at least one quantitative counter to be calculated to generate baseline statistics comprises at least one of a packet length, a session count, a bandwidth utilization, and a session rate.

19. The network node of claim 13, wherein the at least one anomaly rule comprises at least one of a criteria indicating an anomaly, a network usage indicating at least one quantitative counter to be calculated when processing network traffic, and a time duration indicating when the at least one anomaly rule is to be applied.

20. The network node of claim 19, wherein the criteria indicating an anomaly includes at least one filter comprising at least one of a network address, a network interface, a content pattern, and a content signature.

21. The network node of claim 19, wherein the network usage indicating at least one quantitative counter to be calculated when processing network traffic comprises at least one of a packet length, a session count, a bandwidth utilization, and a session rate.

22. The network node of claim 19, wherein the generating the anomaly event comprises at least one of: satisfying an anomaly rule, determining if the criteria indicating an anomaly is satisfied when applied to the network usage indicating at least one quantitative counter to be calculated when processing network traffic, and determining if the criteria indicating an anomaly deviates from the at least one of the pre-determined metrics based on the network usage.

23. The network node of claim 13, wherein the at least one capturing rule comprises at least one of a time duration to capture data, a data capturing action, and a filter.

24. The network node of claim 23, wherein captured network data comprises at least one of a timestamp, a packet trace, a session trace of all content for a session, a network address, or data captured according to a data capturing action.

25. A non-transitory computer-readable medium comprising computer readable code, which when executed by one or more processors, implements a method for capturing network data during a network usage anomaly based on a network usage model, comprising:

establishing a baseline usage by applying at least one baselining rule to processing of network traffic in a data network to generate baseline statistics, the applying the at least one baselining rule includes setting, for the network traffic, pre-determined metrics associated with the baseline usage;

detecting an anomaly usage by:

applying at least one anomaly rule to the network traffic, wherein the applying the at least one anomaly rule includes applying a first filter to the network traffic to perform a first step of capturing at least a first portion of the network data associated with the network traffic and to determine first metrics associated with the network traffic, the first portion of the network data including at least first data packet fragments having a first length; and determining that at least one of the first metrics deviates from at least one of the pre-determined metrics;

in response to the detecting the anomaly usage, triggering a generation of an anomaly event, the anomaly event being generated based on the first metrics;

in response to the generating the anomaly event, triggering at least one capturing rule to perform a second step of capturing at least a second portion of the network data associated with further network traffic going through the data network after the generation of the anomaly event, wherein the triggering the at least one capturing rule includes applying a second filter to the further network traffic, the second portion of the network data including at least second data packet fragments having a second length, the second length being greater than the first length, the second data packet fragments of the second portion of the network data being more detailed network data as compared to the first data packet fragments of the first portion of the network data, wherein the more detailed network data is associated with the anomaly event;

based on the capturing at least the second portion of the network data after the generation of the anomaly event, determining second metrics associated with the further network traffic after the generation of the anomaly event, wherein the second metrics differ from the first metrics; and sending the second metrics to a network controller for determining, based on the second metrics, a cause of the anomaly usage and correcting, by the network controller, a configuration of the data network based on the cause and the second metrics to mitigate the anomaly usage.

* * * * *